(12) United States Patent
Huu et al.

(10) Patent No.: US 10,305,967 B2
(45) Date of Patent: May 28, 2019

(54) UNIFIED CLIENT FOR DISTRIBUTED PROCESSING PLATFORM

(71) Applicant: Business Objects Software Ltd., Dublin (IE)

(72) Inventors: Jacques Doan Huu, Guyancourt (FR); Alan McShane, Baldolye (IE); Ahmed Abdelrahman, Dublin (IE); Fadi Maali, Dublin (IE); Milena Caires, Celbridge (IE)

(73) Assignee: Business Objects Software Ltd., Dublin (IE)

( * ) Notice: Subject to any disclaimer, the term of this patent is extended or adjusted under 35 U.S.C. 154(b) by 85 days.

(21) Appl. No.: 15/261,194

(22) Filed: Sep. 9, 2016

(65) Prior Publication Data

US 2017/0264670 A1 Sep. 14, 2017

Related U.S. Application Data

(60) Provisional application No. 62/307,671, filed on Mar. 14, 2016, provisional application No. 62/307,971, filed on Mar. 14, 2016.

(51) Int. Cl.
| | |
|---|---|
| H04L 29/08 | (2006.01) |
| H04L 29/06 | (2006.01) |
| G06F 9/50 | (2006.01) |
| G06F 9/54 | (2006.01) |
| G06F 16/182 | (2019.01) |

(52) U.S. Cl.
CPC ............ *H04L 67/10* (2013.01); *G06F 9/5072* (2013.01); *G06F 9/54* (2013.01); *G06F 9/541* (2013.01); *G06F 9/547* (2013.01); *G06F 16/182* (2019.01); *H04L 67/141* (2013.01); *H04L 67/42* (2013.01); *Y02D 10/22* (2018.01); *Y02D 10/36* (2018.01)

(58) Field of Classification Search
CPC ........ H04L 67/10; H04L 67/141; H04L 67/42
See application file for complete search history.

(56) References Cited

U.S. PATENT DOCUMENTS

2010/0153444 A1* 6/2010 Nayak ................... G06Q 10/10
707/770
2013/0290223 A1 10/2013 Chapelle et al.
(Continued)

FOREIGN PATENT DOCUMENTS

CN 104899561 9/2015

OTHER PUBLICATIONS

Communication and extended European Search Report dated Jul. 21, 2017 related to EPO Application No. 16002730.6-1879; 12 pages.

(Continued)

*Primary Examiner* — Uzma Alam
(74) *Attorney, Agent, or Firm* — Fish & Richardson P.C.

(57) ABSTRACT

Techniques are described for providing a unified client to interact with a distributed processing platform such as a Hadoop cluster. The unified client may include multiple sub-clients each of which is configured to interface with a particular subsystem of the distributed processing platform, such as MapReduce, Hive, Spark, and so forth. The unified client may be included in an application to provide, for the application, a single interface for communications between the application and the distributed processing platform during a unified communication session.

20 Claims, 5 Drawing Sheets

(56) References Cited

U.S. PATENT DOCUMENTS

| 2015/0052144 | A1* | 2/2015 | Mari | G06F 16/285 |
| | | | | 707/740 |
| 2015/0261846 | A1 | 9/2015 | Hall et al. | |
| 2015/0302015 | A1 | 10/2015 | Saurel et al. | |
| 2017/0148264 | A1* | 5/2017 | Pichette | G06Q 30/06 |
| 2017/0262769 | A1 | 9/2017 | Huu et al. | |

OTHER PUBLICATIONS

Anonymous: "Transfer Learning", Course Notes CS231n Convolutional Neural Networks for Visual Recognition retrieved from the Internet on Jul. 7, 2017, <http://web.archive.org/web/20160312035131/http://cs231n.github.io/transfer-learning/> 4 pages.

Kwon Young-Woo et al: "Reducing the Energy Consumption of Mobile Applications Behind the Scenes", 2013 IEEE International Conference on Software Maintenance, IEEE, Sep. 22, 2013, pp. 170-179, XP032528475; 10 pages.

Gamma E. et al.: "Design Patterns: Elements of Reusable Object-Oriented Software", Chapter 3, Creational Patterns; Sep. 1, 1999, pp. 81-136, XP002207989 (142 pages).

Communication from EPO dated Jul. 17, 2017 for Extended Duropean Search Report; 12 pages.

Andrew S. Tanenbaum: "Distributed Systems: Principles and Paradigms (2nd Edition)" Oct. 12, 2006, Printice Hall, XP055115159; pp. 0-26.

Zhang Xuefu: "Apache Hive on Apache Spark: Motivations and Design Principles", Cloudera Engineering Blog, Jul. 1, 2014; pp. 1-12, XP0555388071; Retrieved from Internet on Jul. 5, 2017: http://blog.cloudera.conn/blog/2014/07/apache-hive-on-apache-spark-motivations-and-design-principles/.

Lambda Architecture for Big Data Systems; Data Science Central, the Online Resource for Big Data Practitioners; 6 pages; Retrieved from Internet on Nov. 19, 2014; http://lambda.com/profiles/blogs/lambda-architecture-for-big-data-systems.

Communication from EPO dated Mar. 26, 2018 for EPO Application No. 16002730.6-1221; 13 pages.

Arno Candel et al. "Deep Learning with H2O", Feb. 2015: Second Edition, Feb. 28, 2015, pp. 1-31, XP0155458761, Retrieved from the Internet on Mar. 13, 2018 URL: https://raw.githubusercontent.com/h2oai/h2o/master/docs/deeplearning/DeepLearningBookletV1.pdf.

* cited by examiner

UNIFIED CLIENT FOR DISTRIBUTED PROCESSING PLATFORM

CROSS-REFERENCE TO RELATED APPLICATION

This application claims priority to U.S. Provisional Patent Application Ser. No. 62/307,971 titled "Predictive Modeling Optimization," and to U.S. Provisional Patent Application Ser. No. 62/307,671 titled "Unified Client for Distributed Processing Platform," both of which were filed on Mar. 14, 2016. The entirety of both of these provisional applications are hereby incorporated by reference into the present application. The present application is related to U.S. patent application Ser. No. 15/261,215 titled "Predictive Modeling Optimization," which was filed on Sep. 9, 2016, the entirety of which is hereby incorporated by reference into the present application.

BACKGROUND

As businesses and other organizations handle increasing amounts of data, systems for data storage and processing have been developed to handle very large data sets. For example, the Hadoop framework developed by the Apache Software Foundation is a platform designed for the distributed storage and distributed processing of very large data sets on clusters of computers. In instances where a platform employs many disparate technologies to store and process data, it can be a challenge to coordinate the various technologies such that they operate together in a reliable and efficient manner.

SUMMARY

Implementations of the present disclosure are generally directed to data processing in a distributed processing platform. More specifically, implementations are directed to a unified client for a distributed processing platform.

In general, innovative aspects of the subject matter described in this specification can be embodied in methods that includes actions of: accessing a unified client from an application, the unified client including a plurality of sub-clients that are each configured to interface with a respective sub-system of a distributed processing platform that includes a plurality of sub-systems; establishing a session for communications between the unified client and the distributed processing platform; and during the session, interfacing with at least one sub-client of the unified client to request at least one sub-system of the distributed processing platform to each perform a data processing operation.

Implementations may optionally include one or more of the following aspects: the actions further include, during the unified session, interfacing with at least two sub-clients of the unified client to request at least two sub-systems of the distributed processing platform to perform at least two data processing operations; the at least two data processing operations are performed in serial by the at least two sub-systems in response to sequential calls from the at least two sub-clients; the at least two data processing operations are performed in parallel by the at least two sub-systems in response to calls from the at least two sub-clients; the at least two sub-clients are different types of sub-clients that interface with different sub-systems of the distributed processing platform; a reference is provided by a first sub-client to a second sub-client of the at least two sub-clients, the reference indicating results of a first data processing operation performed by the first sub-client; the plurality of sub-clients include one or more of: a MapReduce client configured to interface with a MapReduce subsystem; a Hive client configured to interface with a Hive engine subsystem; a Spark client configured to interface with a Spark engine subsystem; a SparkSQL client configured to interface with a SparkSQL subsystem; or a storage client configured to interface with a storage subsystem; and/or the distributed processing platform is a Hadoop platform.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. Implementations provide a unified client that acts as a single interface to interact with all the subsystems supported by a distributed processing platform, and to facilitate the consumption of the various diverse services provided by a distributed processing platform. By combining different subsystems in a single session, the unified client also operates to overcome the individual limitations (e.g., performance limitations, processing capacity, etc.) that may be inherent in each subsystem and/or technology of the distributed processing platform. By providing a single unified client that interacts with a distributed processing platform through a unified communication session, implementations provide for a system that consumes less processing power, memory, storage capacity, and/or networking resources compared to a traditional system that requires multiple sub-subsystem specific clients each employing its own individual communication session.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
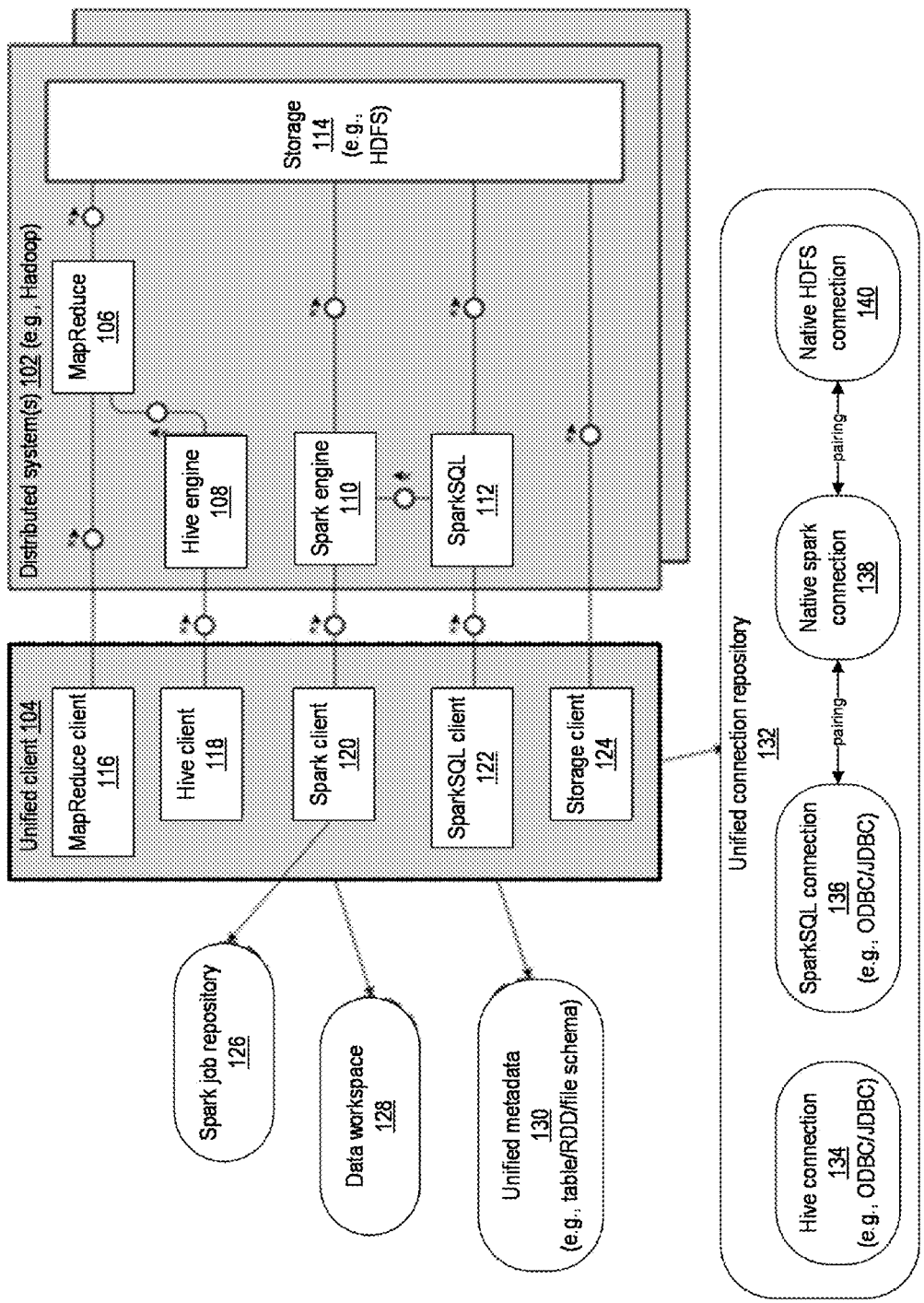
FIG. 1 depicts an example system including a unified client for a distributed processing platform, according to implementations of the present disclosure.

Implementations of the present disclosure are directed to systems, devices, methods, and computer-readable media for providing a unified client to interact with a distributed processing platform. Implementations of the present disclosure will be described with reference to an example distributed processing platform, the Hadoop framework developed by the Apache Software Foundation, it is contemplated that implementations of the present disclosure can be realized using any appropriate distributed processing platform.

A distributed processing platform may store and process large datasets in a batch mode. In the example of Hadoop, the Hadoop ecosystem initially included MapReduce and Hadoop Distributed File System (HDFS), and has grown steadily over time to support other processing engines (e.g., Hive, Impala, Spark, Tez, etc.), other languages (e.g., PIG, HQL, HiveQL, SQL, etc.), and other storage schema (e.g., Parquet, etc.). In particular, the addition of the Spark engine has dramatically improved the distributed processing efficiency of Hadoop compared to its previous version that supported the MapReduce architecture but not Spark. The Spark engine can handle complex processing with many underlying iterations, such as those employed in machine learning.

By supporting a technological "zoo" of many different processing engines, languages, and storage schema, a distributed processing platform presents an engineering challenge when an organization seeks to integrate the platform into a particular organizational context and/or workflow. For example, an information technology group within a business may wish to create an optimal data handling solution that is suited to the business's particular needs, and to do so they may leverage and/or combine the different technologies supported by the platform. The disparate technologies supported by the platform may be complementary to each other and/or may operate concurrently with each other. Traditionally, for an application to combine and/or coordinate the operations of multiple technologies supported by the platform, a large amount of ad hoc and/or specialized code would need to be written. Such code would be difficult to maintain from version to version of the application as the application's design and/or logic changes. Implementations provide a unified client that acts as a single interface to interact with all the subsystems supported by a distributed processing platform, and to facilitate the consumption of the various diverse services provided by a distributed processing platform. By combining different subsystems in a single session, the unified client also operates to overcome the individual limitations (e.g., performance limitations, processing capacity, etc.) that may be inherent in each subsystem and/or technology of the distributed processing platform.

Spark technology has been designed to support long running job execution in batch mode. Spark technology supports job execution through a shell script (e.g., spark-submit). The configuration of the shell script creates its own challenges. For example, the shell script imposes many script arguments and prerequisites, such as the presence of the Hadoop XML configurations on the client side and specific Hadoop environment variables.

From a client application perspective, leveraging Spark may be difficult for various reasons. For example, Spark is difficult to embed into an application runtime landscape. The traditional way to submit a Spark job includes building a custom command line and executing the custom command line in a separate process. Moreover, a Spark job is traditionally self-contained and is executed in one shot without the possibility of returning to the client workflow (e.g., to proceed with intermediate steps) to continue the Spark job execution from the point where it was interrupted. Accordingly, in a traditional platform Spark cannot be readily used in an interactive and/or stateful manner. Moreover, traditionally a Spark connection description may not exist as a separate concept. Instead, a Spark interface may handle a Spark job submission whose configuration includes connection related information and other parameters. In addition, traditionally Spark may not provide the kind of connection repository comparable to that present in an RDBMS context. For at least these reasons, in traditional solutions a Spark interface is difficult to embed, difficult to configure, and may only handle job execution in batch mode, thus preventing intermediate interactions with the client application.

To mitigate and, in some instances, eliminate the above listed restrictions on the existing disparate interfaces in a distributed processing platform, implementations provide for enhanced service consumption in a distributed processing platform. In particular, implementations provide an operational Spark client (e.g., driver) that is embeddable, such that the Spark driver can be loaded into the application process even in a non-JVM process. In some implementations, the Spark runtime is bytecode-based and the Spark client may be configurable at runtime. The Spark driver can consume a predefined Spark connection descriptor which is persisted into a particular repository to ease the connection configuration. The Spark job runtime may be specific to each application domain. The Spark job runtime may be stored in a dedicated repository and may deployable at runtime to a (e.g., Hadoop) cluster. In some implementations, the Spark client provides an interactive and/or stateful connection. A Spark connection may be established to enable the submission of successive jobs with intermediate states which are kept in a virtual workspace. Internally, the Spark connection may correspond to a SparkContext instance.

In some implementations, at least some (or all) of the Hadoop specific client interfaces may be consolidated into a single point client component that is the unified client. The unified client enables the seamless association of various services, e.g., Hive, SparkSQL, Spark, MapReduce, etc., to fulfill a complex and/or heterogeneous data processing chain. Through the unified client, the Spark driver may be aligned at the same level of technical characteristics as the other drivers (e.g., Hive client, HDFS client, etc.).

FIG. 1 depicts an example system including a unified client for a distributed processing platform, according to implementations of the present disclosure. As shown in the example of FIG. 1, the system may include one or more distributed systems 102 in a distributed processing platform. In some instances, the distributed system(s) 102 include Hadoop system(s). Implementations also support other types of distributed system(s) 102. The distributed system(s) 102 may include sub-systems and/or engines such as MapReduce 106, a Hive engine 108, a Spark engine 110, SparkSQL 112, and Storage 114 (e.g., HDFS).

The system may include a unified client 104. The unified client 104 may include sub-clients such as a MapReduce client 116, a Hive client 118, a Spark client 120, a SparkSQL client 122, and/or a storage client 124. The unified client 104 may also include any other appropriate type of sub-client, for example a Simple Concurrent Object-Oriented Programming (SCOOP) client. The sub-clients may also include a HDFS client. In some implementations, the sub-clients may include one or more other (e.g., generic) SQL clients to support SQL implementation(s) other than Spark SQL, such as Cloudera Impala™. Each of the various sub-clients of the unified client 104 may be configured to interface with a corresponding sub-system of the distributed system(s) 102. For example, the MapReduce client 116 may be configured to interface with MapReduce 106, the Hive client 118 may be configured to interface with the Hive engine 108, the Spark client 120 may be configured to interface with the Spark engine 110, the SparkSQL client 122 may be configured to interface with SparkSQL, and the storage client 124 may be configured to interface with storage 114.

In some implementations, the Spark client 120 may access a Spark job repository 126. The unified client 104 may access and employ a data workspace 128 and/or unified metadata 130 (e.g., table, RDD, and/or file schema). In some implementations, the unified client 104 may access a unified connection repository 132. The unified connection repository 132 may include one or more of a Hive connection 134 (e.g., employing ODBC and/or JDBC), a SparkSQL connection 136 (e.g., employing ODBC and/or JDBC), a native Spark connection 138, and/or a native HDFS connection 140. In some instances, there may be a pairing between a SparkSQL connection 136 and a native Spark connection 138. In some instances, there may be a pairing between a Native Spark connection 138 and a Native HDFS connection 140.

The unified connection repository 132 may also be described as a connection metadata repository. The unified connection repository 132 may store metadata that indicates pairings between different connections (e.g., paired connections of different types). Such pairings may enable the interface between different sub-clients such as the MapReduce client 116, the Hive client 118, the Spark client 120, the SparkSQL client 122, the storage client 124, and so forth. During a particular unified session, an application may call into multiple, different sub-clients, and may receive and/or send data through the various sub-clients. The connection pairings that are defined at the metadata level in the unified connection repository 132, enable the combination of sub-clients for use in a particular unified session. The connection pairings defined at the metadata level also enable the switching between sub-clients used during a session. For example, a session may be initiated using one sub-client (e.g., SparkSQL client) and, using the same unified session, the initial sub-client may be associated with (e.g., chained to) one or more other sub-clients may also be used. Such switching between sub-clients may be performed lazily, in that each sub-client shares a minimal common interface and therefore becomes interoperable. For example a Spark sub-client can interoperate with a Hive SQL sub-client or a HDFS client. The actual choice of sub-client may be determined at runtime by the particular session configuration. The association (e.g., chaining) between sub-clients may be performed in a seamless way, without requiring additional authorization or authentication of client credentials. Authentication can be handled by a "single sign on" approach (e.g., using Kerberos) that can authenticate a unified client session once to be used across all the sub-clients. In some implementations, the metadata and/or data issued from a given step in the chaining may not be persistently stored, and may instead be sent on to the next sub-client in the processing chain. Implementations enable the different sub-client interfaces to be combined in a seamless fashion for use during a unified session. Each sub-client may adhere to a common interface and may therefore provide interoperability between sub-clients. This is described further with reference to FIG. 4.

Figure 4:
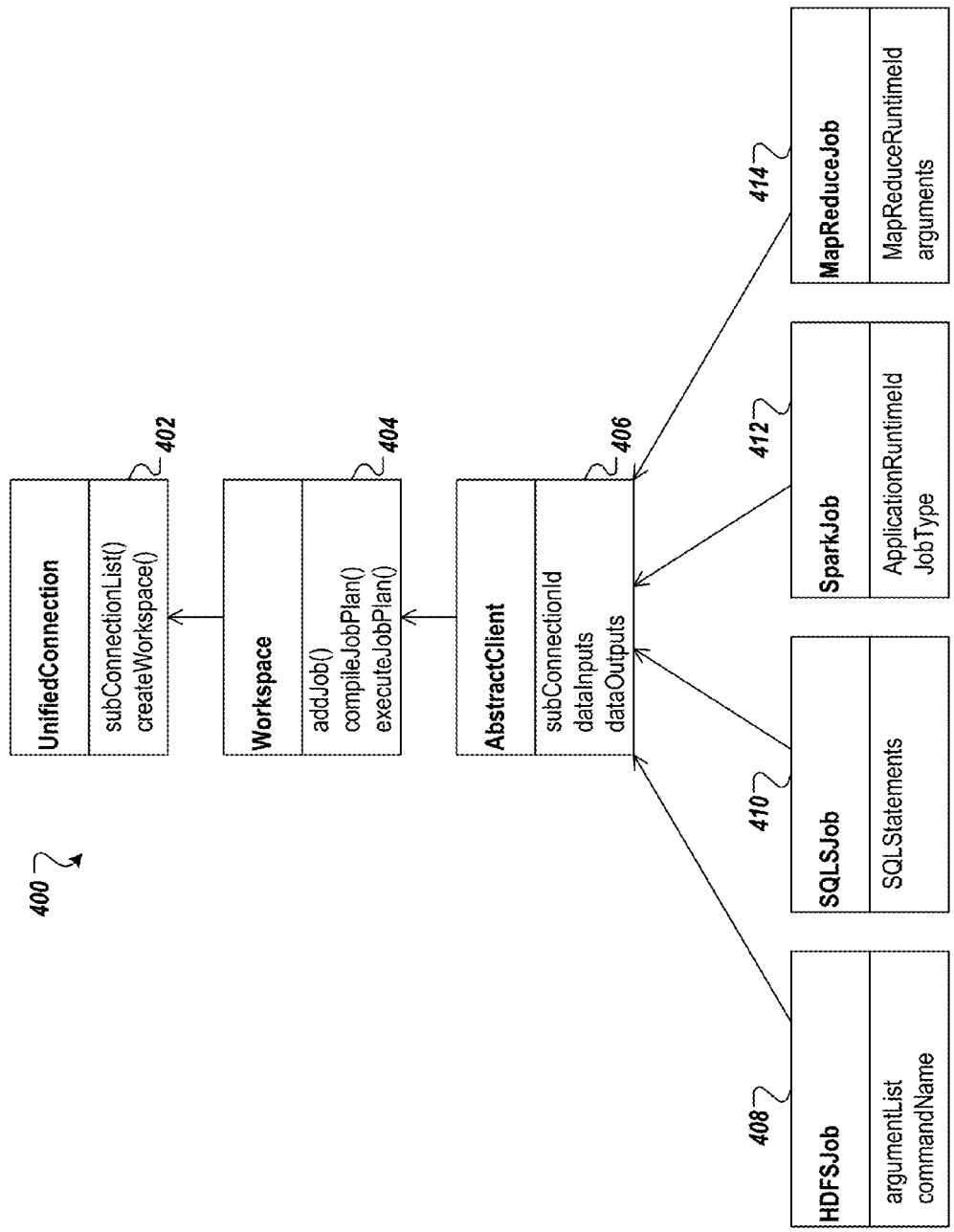
FIG. 4 depicts an example class diagram, according to implementations of the present disclosure.

FIG. 4 depicts an example class diagram 400, according to implementations of the present disclosure. In some implementations, the unified client interface may be implemented according to the class diagram 400. In the example, the class diagram 400 includes a hierarchical arrangement of classes 402, 404, 406, 408, 410, 412, and 414. As shown in the example, each class may include various member methods and member fields. For example, the UnifiedConnection class 404 includes member methods subConnectionList( ) and createWorkspace( ). In some examples, each job handles a particular sub-client, e.g., Spark SQL or RDFS. Each job, such as an instance of a HDFSJob class 408, a SQLSJob class 410, a SparkJob class 412, and/or a MapReduceJob class 414 may implement the interface AbstractClient 406. The following is an example flow of commands through such an implementation. 1) The UnifiedConnection 402 may be instantiated. 2) A stateful instance of the Workspace class 404 may be created, where staging data may reside. 3) A job may be added into the Workspace. In some instances, JSON may include the input and output parameters which may refer to existing results. 4) Job compilation may be triggered (e.g., to build the job graph based on the topological dependencies). In some instances, the system may validate that the job graph is well formed. 5) The job plan may be executed within the unified connection context. Intermediate and/or temporary data may be stored within the workspace. In the example of FIG. 4, "subConnectionId," "ApplicationRuntimeId," and/or "MapReduceRuntimeId" may refer to the unified client repository where connections are predefined and/or where Spark or MapReduce runtimes are stored.

Returning to FIG. 1, the chaining of sub-clients may include receiving data at a first sub-client, which then provides the data for processing by a second sub-client. Although examples herein may describe chaining two sub-clients together during a unified session, implementations enable the chaining of any appropriate number of sub-clients to sequentially handle data. The chaining of sub-clients may be a serial chaining in which data is passes from one sub-client to another, and then to another, and so forth. Chaining may also enable parallel processing, in which multiple sub-clients process the same data at least partly contemporaneously. The chaining may involve branching, in which processing is performed in parallel in multiple sub-clients and/or multiple chains of sub-clients. Chaining may also include the merging and/or rejoining of branches chains for further processing.

The pairing of connections may occur at runtime and may be based on a first connection referring to a second (e.g., Hadoop) subsystem such as a different sub-client than that used for the first connection. Implementations provide a unified client for combining different types of data processing technology, e.g., corresponding to the different sub-clients, to provide a more feature rich data handling solution compared to traditional solutions. Through the unified client, implementations also provide a solution that enables greater flexibility in data handling through leveraging multiple capabilities of the (e.g., Hadoop) platform.

The unified connection repository 132 may store metadata for one or more interface-specific connections. In some instances, such connections may be paired to each other only if they refer to the same sub-system of the distributed system(s) 102. In some examples, the native Spark connection description includes in YARN mode at minimum the XML Hadoop files which are deployed at runtime into the class path of the Spark runtime to properly configure the YARN and/or Hadoop components.

In some instances, the Spark client may be stored in a separate repository from the Spark job runtime packages (e.g., jar files). Such a job artifact can be executed with any Spark connections if the Spark and/or Hadoop versions are compatible.

In some implementations, the unified client 104 exposes the various individual interfaces that it includes. The unified client consumer (e.g., application) may initiate a given connection to a specific interface (e.g., the Hive client). Depending on the predefined connection pairings, the unified client consumer can automatically access other service interface(s) to build a heterogeneous data processing graph, as show in the example of FIG. 2A. In some instances, credentials may be requested to enable access to the paired connections.

Figure 2A:
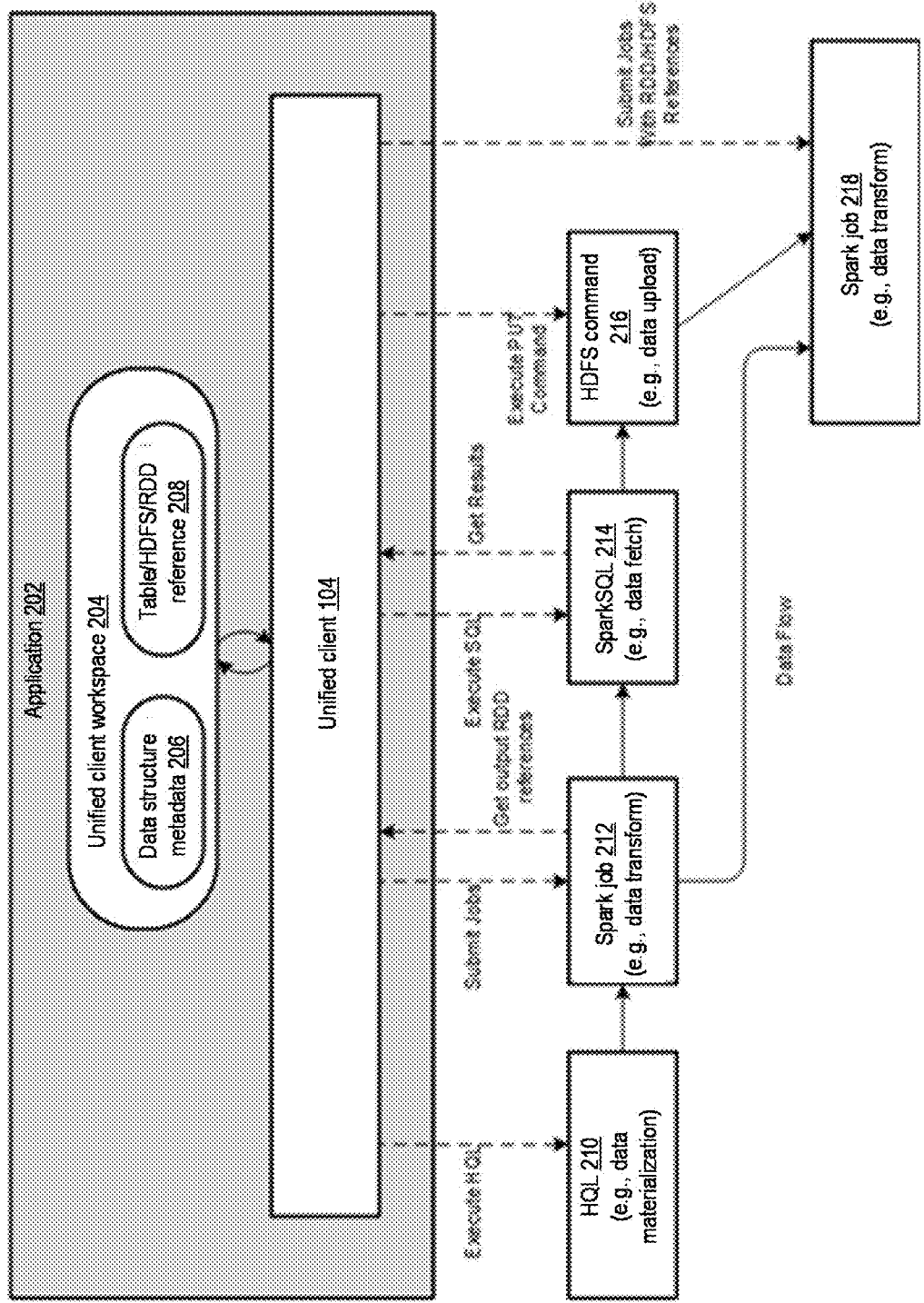
FIG. 2A depicts an example system including an application that employs a unified client, according to implementations of the present disclosure.

A unified connection (e.g., a paired set of connections) may be bound to the virtual data workspace 128, which may include state information for a unified session between the unified client 104 and the distributed system(s) 102. For example, the data workspace 128 may include state information such as one or more intermediate states that are maintained in the form of references and/or identifiers to a Hive table, an in-memory Resilient Distributed Data (RDD), a HDFS filename, and/or client side resources. Such information may enable a stateful connection to be maintained. Maintaining, in the state information, a reference to inmemory RDD may enable different jobs (e.g., Spark or otherwise) to be chained to one another. For example, a first Spark job may return a result as a RDD reference, and another job may consume that result by passing in an argument that is the RDD reference. Jobs may pass in and/or return a reference to the RDD instead of the RDD itself, given the potentially large size of the RDD. The presence of the state information in the data workspace 128 may also enable automatic cleanup to be performed at the end of a session. For example, at least some of the state information may be deleted at the end of a session, such as references (e.g., Hive table) that were created to fetch result(s) back to the unified client 104 and/or application. Implementations enable data to be passed from one processing step to another one along the data flow graph as shown in FIG. 2A.

FIG. 1 provides an example of processing chaining as shown in the unified connection repository 132. For example, a particular session of interactions between the unified client 104 and the distributed system(s) 102 may employ the Spark engine and the Hive engine in a particular way, e.g., using SparkSQL, and also leverage HDFS. Depending on the requirements to be met in a single session handled by the components of the unified client 104, stepwise processing may include uploading of data sets produced through intermediate processing on the application side and push the data sets to the distributed system(s) 102. This may be followed by Spark processing of the data sets. The unified client 104 may enable an application to chain the performance of these various processing steps in a seamless manner. The steps may also include data preparation steps using the HiveQL language. Use of the unified client 104 eliminates the need to port such data preparation jobs into SparkSQL or other languages. For example, the unified client 104 enables an application to leverage Hive to perform the data preparation, leverage the Spark engine to perform various modeling steps, and use Hive and/or Spark to fetch the various results back to the application. The application may then perform intermediate processing of the result(s). Steps may be alternated on the unified client side and/or the distributed system(s) side. For the distributed system(s) side processing, implementations enable the combination of any number of operations in any order including operations in MapReduce, Spark, Hive, HDFS, and so forth.

Although examples herein describe the use of a unified client for use with a single distributed processing platform (e.g., Hadoop), implementations are not so limited. In some implementations, the unified client may be employed to facilitate data handling across multiple distributed processing platforms. In such instances, a unified connection repository 132 may include metadata that describes a connection pairing between two HDFS connections, e.g., to facilitate the transfer and/or copy of data from one distributed processing platform to another. In such instances, the unified client 104 may include a HDFS client as a sub-client to handle such data transport across platforms.

In some implementations, the coupling or pairing of connections may be user-specific, e.g., one or more particular associations between connections may be established and stored for a particular user. In one example, a connection pairing and/or association may be made between the following: an ODBC connection to Hive, Spark SQL, etc.; a Spark connection (e.g., including configuration files and properties); and a HDFS connection. One unified client connection may include these three connections associated together. The one unified client connection configuration may be the same for all users or there may be user-specific values to provide flexibility. For example, an ODBC connection may be general for all users, with more specified ODBC connections for user 1 and user 2. For user 1, the specific ODBC connection may include information for a Spark configuration and a HDFS configuration. For user 2, the specific ODBC connection may include information for a Spark configuration and a HDFS configuration. As another example, a general (e.g., technical user) ODBC connection may be used, but with a custom Spark configuration for user 2. For user 1, the connection may be the generic ODBC connection with Spark configuration files and HDFS configuration. For user 2, the connection may be the generic ODBC connection with Spark configuration files, a custom additional configuration for user 2, and HDFS configuration.

FIG. 2A depicts an example system including an application 202 that employs a unified client 104, according to implementations of the present disclosure. As shown in the example of FIG. 2A, the system may include an application 202. The application 202 may include the unified client 104 and a unified client workspace 204 (e.g., data workspace 128). In some instances, the unified client 104 is embedded (e.g., in process) into the application 202. For example, the unified client 104 may be loaded as a library at runtime to provide, to the application 202, interface capabilities into the various sub-systems of the distributed system(s) 102.

In some instances, the unified client workspace 204 includes data structure metadata 206 and one or more references 208 to a table, HDFS, and/or RDD. The unified client 104 may be configured to access and employ the unified client workspace 204 to perform its various operations. The unified client 104 may execute one or more queries in HQL 210 (e.g., for data materialization). The unified client 104 may submit jobs such as a Spark job 212 (e.g., for data transform), and receive the output RDD references from the Spark job 212. The unified client 104 may execute SQL such as SparkSQL 214 (e.g., for data fetch), and receive result(s) from the SparkSQL 214. The unified client 104 may execute a PUT command through HDFS command 216 (e.g., for data upload). The unified client 104 may submit jobs with RDD and/or HDFS reference(s) to a Spark job 218 (e.g., for data transform).

In some instances, each data reference hosted by the workspace 204 has metadata that describe its structure. The unified client 104 may be configured to manage multiple connections to different sub-systems of the distributed system(s) 102 (e.g., Hadoop). If the unified client consumer needs to construct a data processing graph across sub-systems, the unified client 104 provides for transitional data in a staging area which is part of the data workspace. After a unified connection is closed, the temporary workspace content may be cleaned up automatically by the unified client component.

The unified client 104 may provide, to an application or other consumer, a single point of access to the distributed system(s) 102. The various sub-systems of the distributed system(s) 102 may provide different benefits, and the unified client 104 may enable an application to leverage and/or combine the different benefits of each sub-system in a seamless, efficient manner without the need for a large amount of ad hoc specific coding to be performed.

The unified client 104 enables the creation of a unified session for the application 202 to interface with the distributed system(s) 102. When a unified session is created from the unified client 104, the unified client 104 may create a unified connection that pairs and/or otherwise combines different individual connection types (e.g., to Hive, Spark, HDFS, MapReduce, etc.). To accomplish this unified connection, implementations may specify a native Spark connection description as a set of schema.

Traditionally, a Spark connection is facilitated through use of a shell script which does not separate the establishment of the connection from job submission. In some implementations, the task of establishing a Spark connection may be separate from the task of job submission. Traditionally, Spark is configured to enable jobs to be run in a batch mode and Spark does not enable interactive sessions. In some implementations, the unified client 104 enables interactive Spark sessions between the application 202 and the distributed system(s) 102. For example, the unified client 104 may cause the distributed system(s) 102 to initiate a Spark job, interrupt the job to perform some intermediate step(s), and cause the Spark job to be resumed after the intermediate step(s) are performed.

Traditionally, information describing a Spark connection may be inconveniently located in multiple locations, such as XML files, Hadoop variables, and so forth. In some implementations, a single Spark connection descriptor may include the various Spark connection information, providing a more convenient way for a client to readily access the Spark connection information. The Spark connection descriptor may be in the Spark job repository 126. The unified client 104 may access the Spark job repository 126 to access the Spark connection descriptor and create and/or restore a Spark connection based on the connection information therein. In this way, implementations provide a unified client 104 that effectively treats Spark similarly to other engines supported by the distributed system(s) 102, thus facilitating the application's use of Spark for processing. The unified client 104 provides a single interface that enables the application 202 may interact with the various sub-systems in a similar manner, instead of requiring ad hoc and/or specialized code to be written to interact with each different sub-system.

The particular chaining of sub-clients shown in FIG. 2A, e.g., HQL 210 to Spark job 212 to SparkSQL 214, etc., is provided as an example, and implementations are not limited to this example. In general, any suitable number and type of sub-clients may be chained in any order, in serial and/or in parallel, to perform data processing. In the example of FIG. 2A, the spark job 212 processes data and provides results of the processing to both SparkSQL 214 and another spark job 218, as an example of branching for parallel processing as described above. Particular sub-clients may be employed to perform particular types of operations during an instance of chaining. For example, certain sub-clients may be used to retrieve data from storage, whereas other sub-clients may be used to transform the data in some way. After a processing step has been performed, some metadata may be returned to the unified client 104 to indicate a result of the processing or to indicate that processing has been performed. Such returned metadata may include a reference to the results, such as the output RDD references shown in FIG. 2A as returned from the Spark job 212. Results of various processing steps performed by the various sub-clients may be associated with one another through use of references.

Figure 2B:
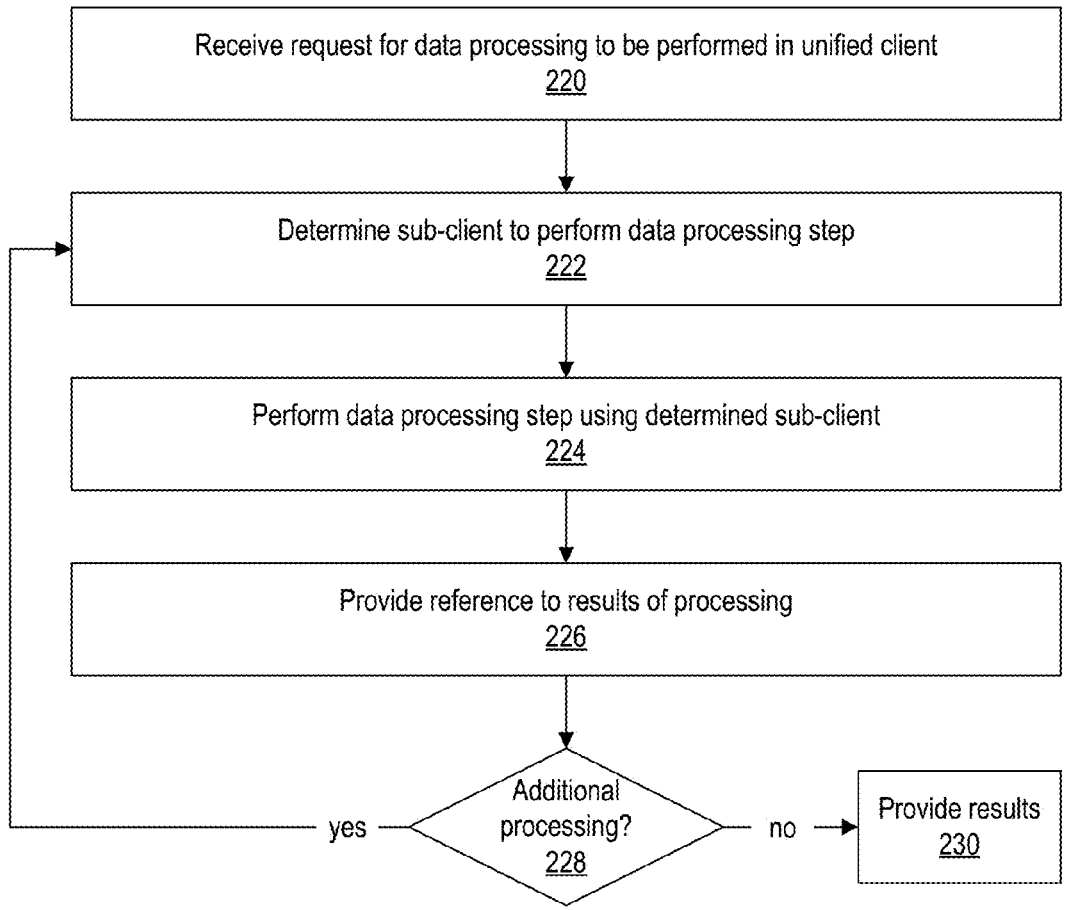
FIG. 2B depicts an example flow diagram of a process for employing a unified client for data processing, according to implementations of the present disclosure.

FIG. 2B depicts an example flow diagram of a process for employing a unified client for data processing, according to implementations of the present disclosure. Operations of the process may be performed by the application 202, the unified client 104, and/or other software modules executing on a client computing device, device(s) of the distributed processing platform, or elsewhere.

A request is received (220), indicating data processing to be performed in a distributed processing platform using the unified client 104. In some instances, the request may be received from the application 202 calling into the unified client 104.

A sub-client of the unified client 104 is determined (222) to perform the data processing step. In some instances, the flow and chain of data processing can be pre-determined to solve a particular problem. In some instances, the flow and chain of data processing can be determined at runtime through flexible input configuration and/or based on the results of data processing. For example, if a dataset is determined to be trivial (e.g., lower cost) to process in one sub-client relative to another, that choice of the lower cost sub-client can be made at runtime. The data processing step is performed (224) using the determined sub-client, and the results may be provided for further processing. In some implementations, a reference may be provided (226) pointing to the results, so that other sub-clients may perform further processing steps on the resulting data.

A determination is made (228) whether additional processing is needed. If not, the results of the last processing step may be provided (230), e.g., to the application 202. If further processing is needed, the process may return to 222 and determine another sub-client that is a same or different sub-client than that used in the previous step. Processing steps may be performed serially by a sequence of (same or different) sub-clients, and/or processing steps may be performed in parallel by multiple sub-clients of a same or different type.

In some instances, at least some data processing may be performed on the client side, e.g., outside the distributed processing platform. For example, results may be received back from the Hadoop processor, through the Get Results flow shown in FIG. 2A. Local processing may be performed on the received results, and the results of the local processing may be sent for further processing by other sub-clients. Implementations enable at least some of the processing steps to be performed outside of the distributed processing platform (e.g., the Hadoop system).

Figure 3:
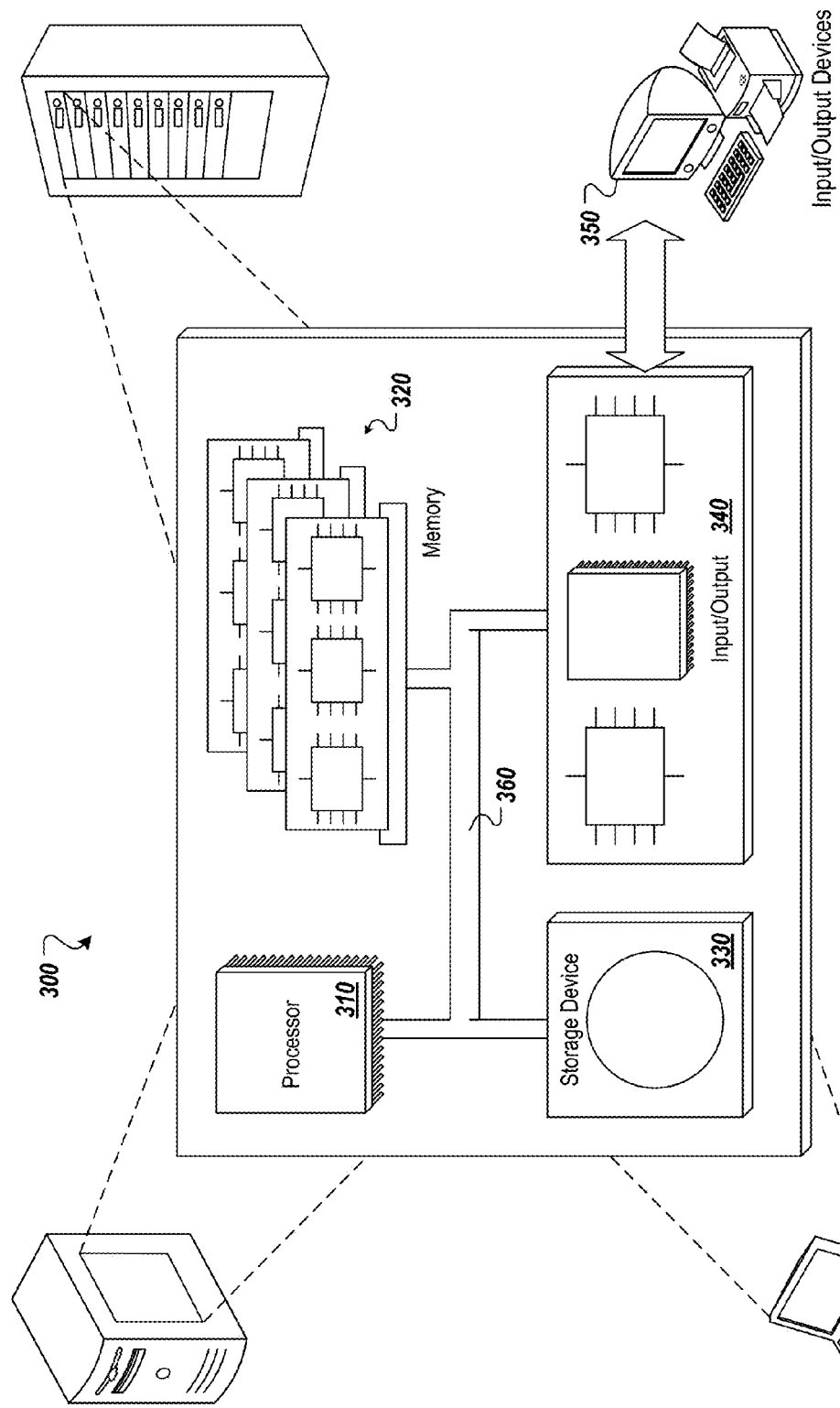
FIG. 3 depicts an example computing system, according to implementations of the present disclosure.

FIG. 3 depicts an example computing system, according to implementations of the present disclosure. The system 300 may be used for any of the operations described with respect to the various implementations discussed herein. For example, the system 300 may be included, at least in part, in the distributed system(s) 102 and/or other computing device(s) described herein. The system 300 may include one or more processors 310, a memory 320, one or more storage devices 330, and one or more input/output (I/O) devices 350 controllable via one or more I/O interfaces 340. The various components 310, 320, 330, 340, or 350 may be interconnected via at least one system bus 360, which may enable the transfer of data between the various modules and components of the system 300.

The processor(s) 310 may be configured to process instructions for execution within the system 300. The processor(s) 310 may include single-threaded processor(s), multi-threaded processor(s), or both. The processor(s) 310 may be configured to process instructions stored in the memory 320 or on the storage device(s) 330. The processor(s) 310 may include hardware-based processor(s) each including one or more cores. The processor(s) 310 may include general purpose processor(s), special purpose processor(s), or both.

The memory 320 may store information within the system 300. In some implementations, the memory 320 includes one or more computer-readable media. The memory 320 may include any number of volatile memory units, any number of non-volatile memory units, or both volatile and non-volatile memory units. The memory 320 may include read-only memory, random access memory, or both. In some examples, the memory 320 may be employed as active or physical memory by one or more executing software modules.

The storage device(s) 330 may be configured to provide (e.g., persistent) mass storage for the system 300. In some implementations, the storage device(s) 330 may include one or more computer-readable media. For example, the storage device(s) 330 may include a floppy disk device, a hard disk device, an optical disk device, or a tape device. The storage device(s) 330 may include read-only memory, random access memory, or both. The storage device(s) 330 may include one or more of an internal hard drive, an external hard drive, or a removable drive.

One or both of the memory 320 or the storage device(s) 330 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 300. In some implementations, the CRSM may include a data store that provides storage of computer-readable instructions or other information in a non-transitory format. The CRSM may be incorporated into the system 300 or may be external with respect to the system 300. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 310 and the memory 320 may be supplemented by, or incorporated into, one or more application-specific integrated circuits (ASICs).

The system 300 may include one or more I/O devices 350. The I/O device(s) 350 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 350 may also include one or more output devices such as a display, LED(s), an audio output device (e.g., a speaker), a printer, a haptic output device, and so forth. The I/O device(s) 350 may be physically incorporated in one or more computing devices of the system 300, or may be external with respect to one or more computing devices of the system 300.

The system 300 may include one or more I/O interfaces 340 to enable components or modules of the system 300 to control, interface with, or otherwise communicate with the I/O device(s) 350. The I/O interface(s) 340 may enable information to be transferred in or out of the system 300, or between components of the system 300, through serial communication, parallel communication, or other types of communication. For example, the I/O interface(s) 340 may comply with a version of the RS-232 standard for serial ports, or with a version of the IEEE 1284 standard for parallel ports. As another example, the I/O interface(s) 340 may be configured to provide a connection over Universal Serial Bus (USB) or Ethernet. In some examples, the I/O interface(s) 340 may be configured to provide a serial connection that is compliant with a version of the IEEE 1394 standard.

The I/O interface(s) 340 may also include one or more network interfaces that enable communications between computing devices in the system 300, or between the system 300 and other network-connected computing systems. The network interface(s) may include one or more network interface controllers (NICs) or other types of transceiver devices configured to send and receive communications over one or more networks using any network protocol.

Computing devices of the system 300 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 300 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor that executes an application, the method comprising:
    accessing, by the at least one processor, a unified client from the application, the unified client including a plurality of sub-clients that are each configured to interface with a respective sub-system of a distributed processing platform that includes a plurality of sub-systems;
    establishing, by the at least one processor, through the unified client, a single session for communications between the unified client and at least two of the plurality of sub-systems included in the distributed processing platform, wherein the single session is a unified session that includes at least: i) a first connection that connects a first sub-client with a first sub-system, and ii) a second connection that connects a second sub-client with a second sub-system, wherein the first connection is associated with the second connection in a connection pairing that is described in a unified connection repository; and
    during the single session, interfacing, by the at least one processor, the application with the first sub-client of the unified client to request the first sub-system of the distributed processing platform to perform at least one first data processing operation, and switching to interface the application with the second sub-client of the unified client to request the second sub-system of the distributed processing platform to perform at least one second data processing operation, the switching being based on the connection pairing that associates the first connection with the second connection.

2. The method of claim 1, wherein the first and second sub-clients interoperate through a common interface.

3. The method of claim 1 wherein the first and second data processing operations are performed in serial by the first and second sub-systems in response to sequential calls from the first and second sub-clients.

4. The method of claim 1 wherein the first and second data processing operations are performed in parallel by the first and second sub-systems in response to calls from the first and second sub-clients.

5. The method of claim 1 wherein the first and second sub-clients are different types of sub-clients that interface respectively with the first and second sub-systems that are different sub-systems of the distributed processing platform.

6. The method of claim 1 wherein a reference is provided by the first sub-client to the second sub-client, the reference indicating results of the at least one first data processing operation performed by the first sub-system.

7. The method of claim 1, wherein the plurality of sub-clients include one or more of:
    a MapReduce client configured to interface with a MapReduce subsystem;
    a Hive client configured to interface with a Hive engine subsystem;
    a Spark client configured to interface with a Spark engine subsystem;
    a SparkSQL client configured to interface with a SparkSQL subsystem; or
    a storage client configured to interface with a storage subsystem.

8. The method of claim 1, wherein the distributed processing platform is a Hadoop platform.

9. A system comprising:
    at least one processor; and
    a memory communicatively coupled to the at least one processor, the memory storing instructions which, when executed by the at least one processor, cause the at least one processor to perform operations comprising:
        accessing a unified client from an application executed by the at least one processor, the unified client including a plurality of sub-clients that are each configured to interface with a respective sub-system of a distributed processing platform that includes a plurality of sub-systems;
        establishing, through the unified client, a single session for communications between the unified client and at least two of the plurality of sub-systems included in the distributed processing platform, wherein the single session is a unified session that includes at least: i) a first connection that connects a first sub-client with a first sub-system, and ii) a second connection that connects a second sub-client with a second sub-system, wherein the first connection is associated with the second connection in a connection pairing that is described in a unified connection repository; and
        during the single session, interfacing the application with the first sub-client of the unified client to request the first sub-system of the distributed processing platform to perform at least one first data processing operation, and switching to interface the application with the second sub-client of the unified client to request the second sub-system of the distributed processing platform to perform at least one second data processing operation, the switching being based on the connection pairing that associates the first connection with the second connection.

10. The system of claim 9, wherein the first and second sub-clients interoperate through a common interface.

11. The system of claim 9, wherein the first and second data processing operations are performed in serial by the first and second sub-systems in response to sequential calls from the first and second sub-clients.

12. The system of claim 9, wherein the first and second data processing operations are performed in parallel by the first and second sub-systems in response to calls from the first and second sub-clients.

13. The system of claim 9, wherein the first and second sub-clients are different types of sub-clients that interface respectively with the first and second sub-systems that are different sub-systems of the distributed processing platform.

14. The system of claim 9, wherein a reference is provided by the first sub-client to the second sub-client, the reference indicating results of the at least one first data processing operation performed by the first sub-system.

15. The system of claim 9, wherein the plurality of sub-clients include one or more of:
 a MapReduce client configured to interface with a MapReduce subsystem;
 a Hive client configured to interface with a Hive engine subsystem;
 a Spark client configured to interface with a Spark engine subsystem;
 a SparkSQL client configured to interface with a SparkSQL subsystem; or
 a storage client configured to interface with a storage subsystem.

16. The system of claim 9, wherein the distributed processing platform is a Hadoop platform.

17. One or more non-transitory computer-readable storage media storing instructions which, when executed by at least one processor, cause the at least one processor to perform operations comprising:
 accessing a unified client from an application executed by the at least one processor, the unified client including a plurality of sub-clients that are each configured to interface with a respective sub-system of a distributed processing platform that includes a plurality of sub-systems;
 establishing, through the unified client, a single session for communications between the unified client and at least two of the plurality of sub-systems included in the distributed processing platform, wherein the single session is a unified session that includes at least: i) a first connection that connects a first sub-client with a first sub-system, and ii) a second connection that connects a second sub-client with a second sub-system, wherein the first connection is associated with the second connection in a connection pairing that is described in a unified connection repository; and
 during the single session, interfacing the application with the first sub-client of the unified client to request the first sub-system of the distributed processing platform to perform at least one first data processing operation, and switching to interface the application with the second sub-client of the unified client to request the second sub-system of the distributed processing platform to perform at least one second data processing operation, the switching being based on the connection pairing that associates the first connection with the second connection.

18. The one or more non-transitory computer-readable storage media of claim 17, wherein the first and second sub-clients interoperate through a common interface.

19. The one or more non-transitory computer-readable storage media of claim 17, wherein the plurality of sub-clients include one or more of:
 a MapReduce client configured to interface with a MapReduce subsystem;
 a Hive client configured to interface with a Hive engine subsystem;
 a Spark client configured to interface with a Spark engine subsystem;
 a SparkSQL client configured to interface with a SparkSQL subsystem; or
 a storage client configured to interface with a storage subsystem.

20. The one or more non-transitory computer-readable storage media of claim 17, wherein the distributed processing platform is a Hadoop platform.

* * * * *